Hall & Lowrey,
Horse Collar,
N°. 9,272.  Patented Sep. 21, 1852.
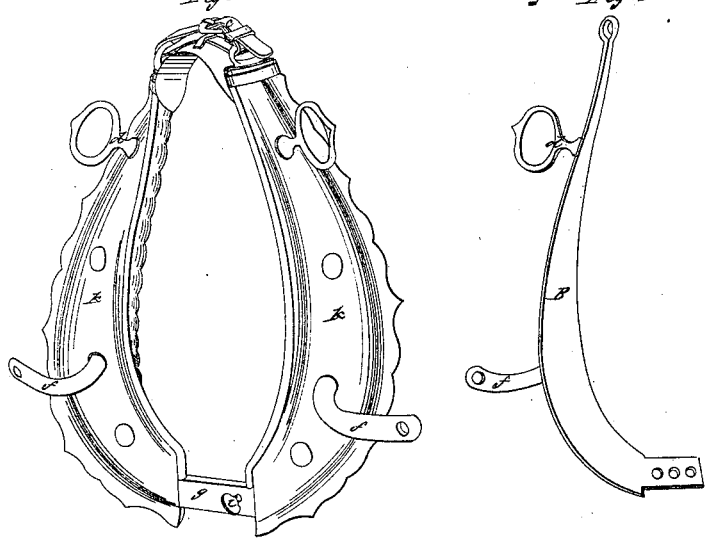
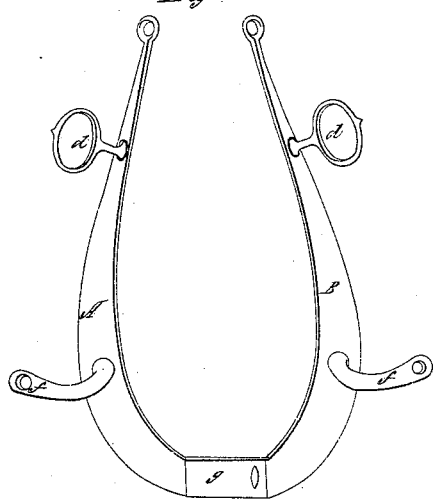
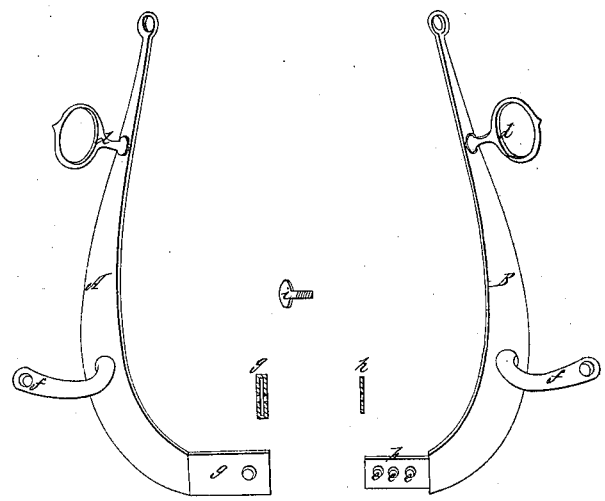

United States Patent Office.

J. H. HALL AND JOHN LOWREY, OF WHEELING, VIRGINIA.

IMPROVEMENT IN HORSE-COLLARS.

Specification forming part of Letters Patent No. 9,272, dated September 21, 1852.

*To all whom it may concern:*

Be it known that we, J. H. HALL and JOHN LOWREY, of Wheeling, in the county of Ohio and State of Virginia, have invented a new and useful Improvement in the Construction of Horse-Collars; and we do hereby declare that the following is a full, clear, and exact description of our said invention, reference being had to the accompanying drawings, which form part of this specification, and in which—

Figure 1 represents a view in perspective of our improved horse-collar; and Figs. 2, 3, and 4 are views of the frame of the same in various positions.

Our invention consists of a metallic-framed collar which can be expanded or contracted to suit horses of different size and which maintains the parallelism of its sides, however much it is expanded or contracted.

The metallic frame, as represented in the accompanying drawings, consists of two side pieces or cheeks A B, which are flattened and bent to fit the opposite sides of a horse's neck. Each cheek has an eye formed at its upper end for the insertion of the strap $c$, by means of which the upper extremities of the cheeks are connected. Each cheek is also fitted with a terret $d$ and with a tug-iron $f$, to which the trace is attached. The lower extremity of one cheek A is bent at right angles to its general direction, and is socketed to form a box $g$. The corresponding lower extremity of the other cheek is also bent at right angles to its general direction and is formed into a shank $h$, which fits into the box of the opposite cheek. The shank thus formed is perforated with a series of holes $e$, and the box is fitted with a clamp-screw $i$, which passes transversely through it. When, therefore, the shank is entered in the box, the clamp-screw can be passed through the two to hold them firmly together, and thus secure the lower extremities of the cheeks. The frame thus formed is padded on its inner side and is covered with leather $k$, to which the pads are sewed and which is firmly secured to the frame by rivets or screws.

From the above description it is evident that the two cheeks of the collar may be moved toward or from each other to contract or expand the space between them by simply moving the shank of the one cheek in the box of the other, while the two are maintained in whatever position they may be placed by passing the screw through the proper holes. It will also be perceived that the box acts as a guide to the shank in moving. Hence the two cheeks preserve their parallelism, however much the collar is expanded or contracted. This property of the collar is of importance, as it insures an equable bearing upon the shoulders of the horse and lessens the chance of galling. The collar thus described is also extremely convenient, as it dispenses with the employment of separate hames, and it is readily applied to and disengaged from the horse's neck by slacking the strap at the top and disconnecting its two cheeks at the bottom.

We do not claim a rigid collar nor a collar capable of expansion and contraction sidewise when the sides are connected by a third or intermediate part or supported by a frame; but What we do claim as our invention, and desire to secure by Letters Patent, is—

The construction and arrangement of the two sides of the collar so that they fit together and can be moved toward and from each other by a parallel motion to diminish or enlarge the aperture for the horse's neck and then be fastened by a set-screw or its equivalent to form a rigid frame, substantially as herein described.

In testimony whereof we have hereunto subscribed our names.

J. H. HALL.
JOHN LOWREY.

Witnesses:
WM. McCONNELL,
JAMES McCONNELL.